United States Patent [19]

DeMuth

[11] 4,448,379
[45] May 15, 1984

[54] LIGHT SOURCE MOUNTING BRACKET FOR A FACSIMILE DOCUMENT SCANNER

[75] Inventor: Raymond W. DeMuth, Carpentersville, Ill.

[73] Assignee: Teletype Corporation, Skokie, Ill.

[21] Appl. No.: 368,617

[22] Filed: Apr. 15, 1982

[51] Int. Cl.³ ............................................. F16M 11/00
[52] U.S. Cl. ...................................... 248/201; 248/342; 49/255
[58] Field of Search ............ 248/342, 343, 201, 205.2, 248/213.2, 213.4, 213.6, 207, 202.1; 355/8; 292/303; 49/254, 255

[56] References Cited

U.S. PATENT DOCUMENTS

| | | | |
|---|---|---|---|
| 347,852 | 9/1886 | White | 49/254 |
| 1,192,161 | 7/1916 | Bowser | 49/254 X |
| 3,990,739 | 11/1976 | Head | 49/255 X |
| 4,084,898 | 4/1978 | Kurita | 355/8 |
| 4,141,545 | 2/1979 | Schnall et al. | 355/8 X |

Primary Examiner—Ramon S. Britts
Assistant Examiner—Sarah A. Lechok
Attorney, Agent, or Firm—W. K. Serp; J. C. Albrecht

[57] ABSTRACT

A bracket 18 is illustrated for mounting a light source 24 on a facsimile document scanner 10. The bracket 18 includes a pair of end plates 20, 22 between which the light source 24 is supported. Opposing ends of each plate 20, 22 have hinge pins 30, 30a which engage "L" shaped cutouts 38, 38a in opposing hinge plates 36, 36a mounted on the scanner 10. The hinge pins 30, 30a are held in their respective cutouts 36, 36a by coil springs 60, 60a. The remaining ends of the end plates 20, 22 have lock pins 32, 32a which engage "L" shaped cutouts 42, 42a in lock plates 40, 40a mounted on the scanner 10. Lock clips 50, 50a serves to maintain the lock pins 32, 32a in their respective lock plate cutouts 42, 42a.

7 Claims, 4 Drawing Figures

LIGHT SOURCE MOUNTING BRACKET FOR A FACSIMILE DOCUMENT SCANNER

TECHNICAL FIELD

This invention relates to a bracket for mounting a light source on a facsimile document scanner.

BACKGROUND ART

In a facsimile system, a document scanner converts the information printed on a document into a series of electrical signals which are transmitted to a receiving device whereat a copy of the original document is produced. The document to be scanned is placed on a transparent pane providing a document support surface. The document is scanned by a scanning mechanism which views selected, illuminated portions of the document through the pane. In such scanners, the document is generally illuminated by an elongated fluorescent light source. The light source is positioned adjacent a viewing aperature of the scanning mechanism. Occasionally, during routine maintenance of the scanner, the light source and viewing aperature require cleaning. Heretofore, cleaning of the scanning mechanism has been difficult since removal of the light source was usually necessary to obtain access to the aperature and surrounding areas. The bracket assembly disclosed provides a convenient mounting for a fluorescent light source which greatly facilitates bulb replacement and cleaning of the scanning mechanism.

DISCLOSURE OF THE INVENTION

This invention is directed to a light source mounting bracket for a facsimile document scanner having a scanning mechanism movable along a predetermined path. The bracket includes a pair of parallel, spaced apart end plates between which the light source is positioned. Means are provided for maintaining the end plates in spaced apart parallel relationship. Projecting from each of the facing surfaces of the end plates is a hinge pin. The hinge pins are located upon a common axis. A pair of hinge plates are secured to the scanning mechanism and each plate provides a support for one of the hinge plates thereby providing a hinge for movement of the mounting bracket between an operating position and a service position. A release mechanism is mounted upon the scanning mechanism and cooperates with the end plates for releasably retaining the mounting bracket in the operating position.

Preferably, the release mechanism includes a pair of coaxially oriented lock pins each of which projects from one of the surfaces of each of the end plates. A pair of spatially positioned lock plates are secured to the scanning mechanism, said lock pins and lock plates cooperating to selectively retain the bracket in the operating position.

More particularly, the hinge plates have "L" shaped cutouts for receiving the hinge pins and first and second hinge springs for holding the hinge pins in their respective hinge plate cutouts. The lock plates have similar "L" shaped cutouts for receiving the lock pins.

THE DRAWINGS

FIG. 1 is a perspective view of a facsimile document scanner including a light source mounting bracket in an operating position, FIG. 2 is a perspective view of a portion of the document scanner of FIG. 1 with the light source mounting bracket shown in its alternate, service position, FIG. 3 is a sectional view taken along the line 3—3 of FIG. 1, and FIG. 4 is a sectional view taken along the line 4—4 of FIG. 1.

DETAILED DESCRIPTION

Figure 1:
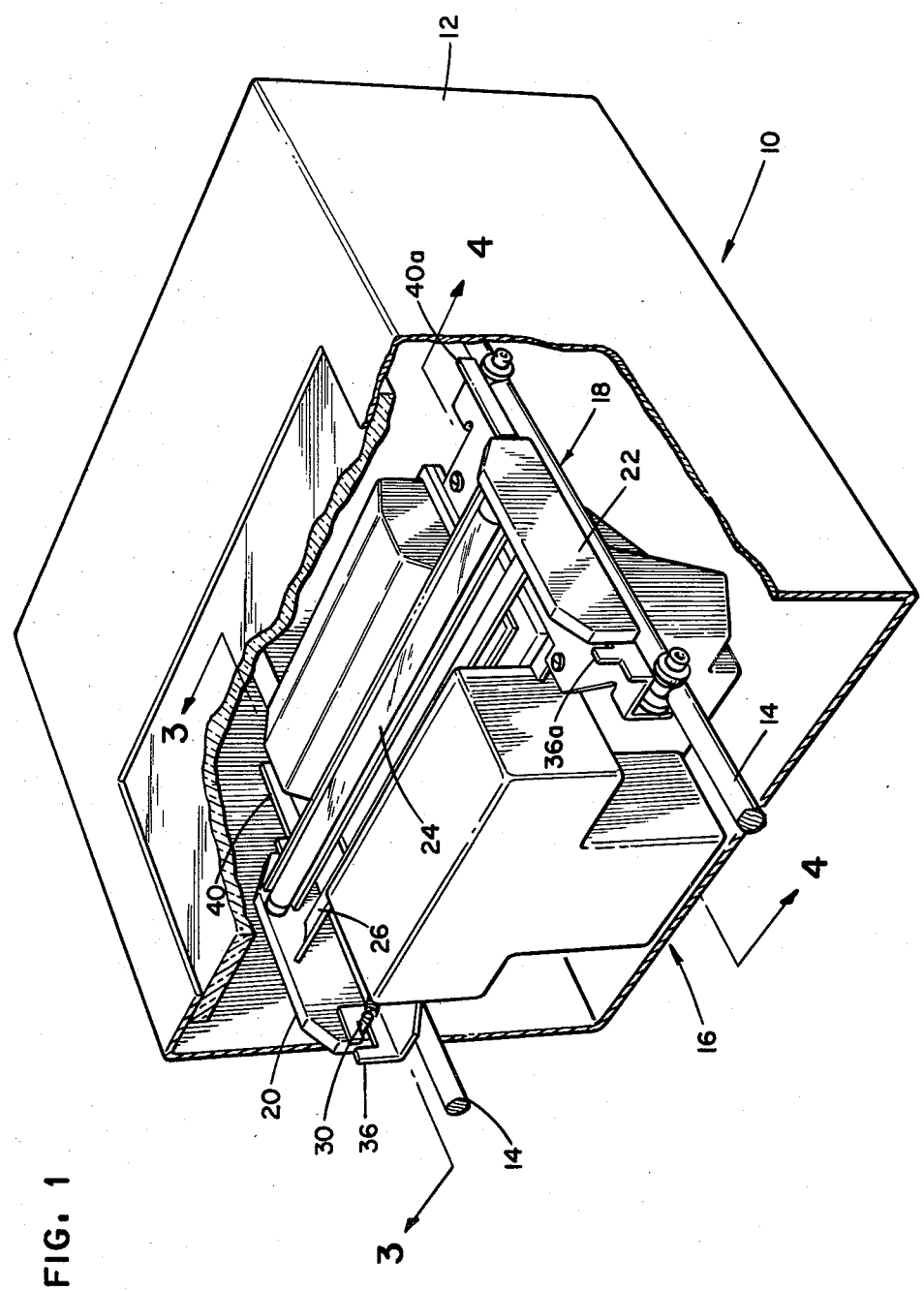

A document scanner 10 is illustrated in FIG. 1 which includes a cabinet 12 having mounted therein a pair of parallel support rails 14. Positioned upon and supported by the rails 14 is a scanning mechanism 16 which successively scans selected portions of a document (not shown) and provides a serial output signal in response to the light levels reflected from the document. For a more detailed discussion of the structure of the illustrated scanning mechanism 16, the reader is directed to a simultaneously filed U.S. Patent Application by N. Jacobs et al entitled "Method and Apparatus for Adjusting a Facsimile Document Scanner", having a common assignee with this application. Mounted upon the scanning mechanism 16 is a light source mounting bracket 18 which is movable between an operating position and a service position.

Figure 2:
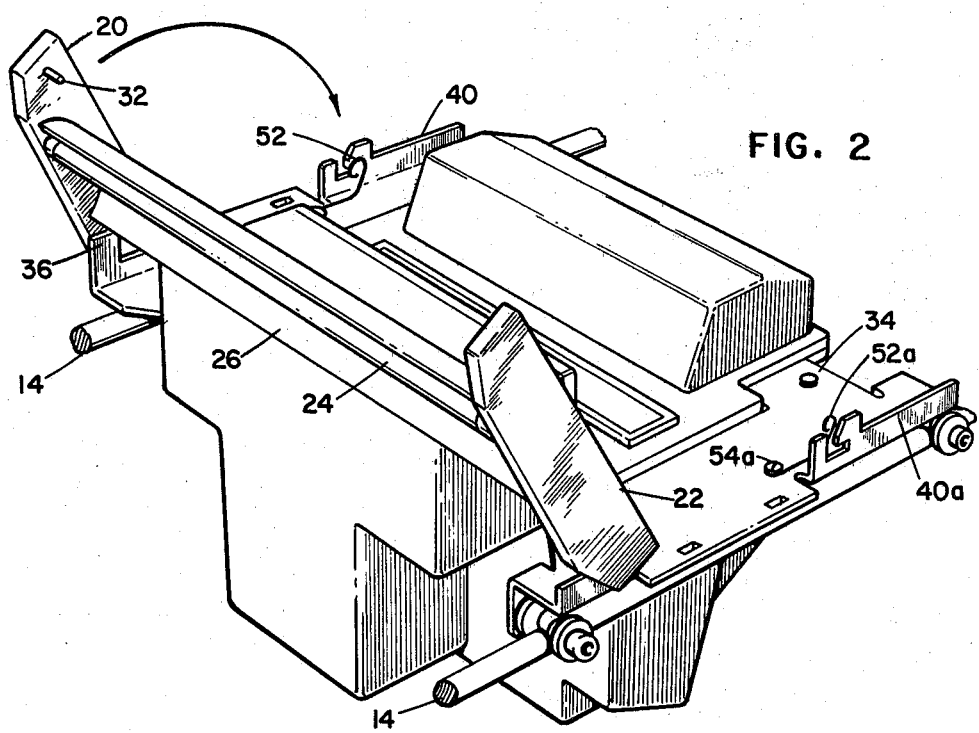
Figure 3:
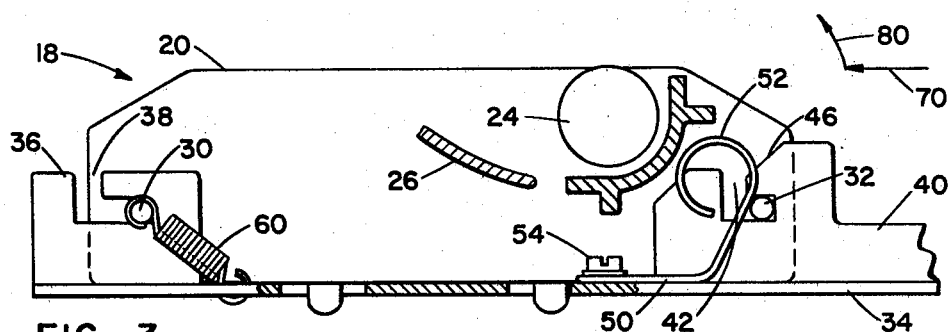
Figure 4:
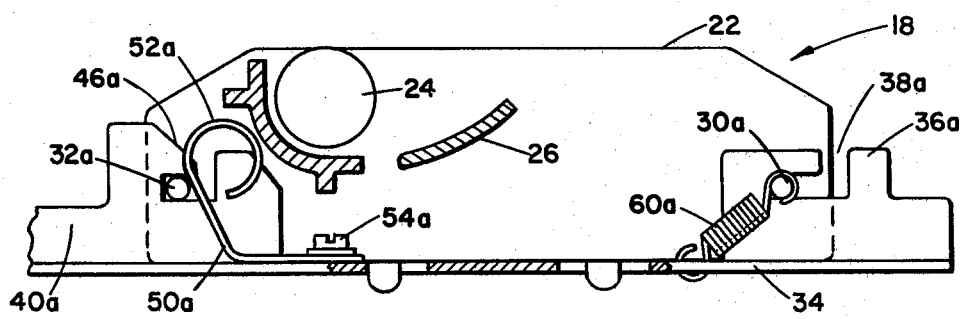

As particularly illustrated in FIGS. 2, 3, and 4, the mounting bracket 18 includes a pair of parallel, opposing end plates 20, 22 which are spaced apart a distance approximately equal to the length of a fluorescent light source 24. Maintained within the end plate 20, 22 is electrical wiring (not shown) for energizing the light source 24. The ends of an elongated curved reflector 26 are secured to the end plates 20, 22 and the reflector 26 holds the end plates 20, 22 in the desired spatial relationship. The reflector 26 directs and concentrates the light from light source 24 upon the document being scanned.

The components associated with the end plate 20 will be described in detail with corresponding components carried by the opposing end plate 22 designated by a similar reference numeral provided with the suffix "a". A hinge pin 30 is mounted adjacent one end of the inwardly disposed surface of the end plate 20, and similarily, a hinge pin 30a is mounted on the opposite end plate 22 with both hinge pins 30, 30a being coaxially aligned. On the opposite end of the inwardly disposed surface, the end plate 20 is mounted a locking pin 32. Similarily, a locking pin 32a is mounted on the opposite end plate 22 with both locking pins 32, 32a being coaxially aligned. The scanning assembly 16 includes a base plate 34, and formed along one edge thereof is a hinge plate 36, the plane of which is normal to the plane of the base plate 34. The hinge plate 36 has an "L" shaped cutout 38. The width of the cutout 38 is slightly greater than the diameter of the hinge pin 30 to allow free movement of the hinge pin 30 therein. In a similar manner, the opposite end of the base plate 34 is formed to define a lock plate 40 with the surface of the lock plate 40 being coplanar with the surface of the hinge plate 36. The lock plate 40 has an "L" shaped cutout 42 with the width of the cutout 42 being slightly greater than the diameter of the lock pin 32 to allow free movement of the lock pin 32 therein. Additionally, the lock plate 40 displays a camming surface 46 for engaging the lock pin 32 and directing it into the cutout 42 in a manner to be hereinafter further considered. The hinge 34 and lock plates 36, 40 are spaced along the base plate 34 in a line which is parallel to the tracks 14, and the plates 36, 40 are spaced so that the distance between the upwardly extending legs of the related pair of cutouts 38, 42 is equal to the distance between the lock and hinge pins 30, 32 on the end plate 20. Positioned adjacent the lock plate 40 is a lock pin retaining clip 50. The clip 50 is formed of spring wire shaped into a camming loop 52 with one end of the spring 50 mounted on the base plate 34 by a fastener 54. The loop 52 of the clip 50, in its normal position, obstructs the vertical leg of the "L" shaped cutout 42.

During assembly, the hinge pins 30, 30a are placed in their respective cutouts 38, 38a and held into the end of the horizontal portion of the cutout by respective coil springs 60, 60a. One end of each of the coil springs 60, 60a is hooked over the free end of a respective hinge pin 30, 30a with the remaining end secured to a hole in the base plate 34. The coil springs 60, 60a hold the hinge pins in the position illustrated in FIG. 3, and the pins 30, 30a freely pivot with respect to the hinge plate 36, 36a. As the lamp bracket 18 is moved from the service position illustrated in FIG. 2, to the operating position of FIGS. 3 and 4, the lock pins 32, 32a strike the cam surfaces 46, 46a of the respective lock plates 40, 40a and as the bracket 18 is forced toward the base plate 34, the lock pins 32, 32a are cammed in the direction of arrow 70 (FIG. 3) against the bias of the respective clips 50, 50a. As the lock pins 32, 32a ride down along the respective cam surfaces 46, 46a, the retaining clips 50, 50a are deflected in the direction of the arrow 70 and the lock pins 32, 32a fall into their respective cutouts 42, 42a. Once the lock pins 32, 32a fall to the bottom of their respective cutouts 42, 42a, the lamp bracket 18 is forced to the right (FIG. 3) by the coil spring 60, 60a and clips 50, 50a until the lock pins 32, 32a and hinge pins 30, 30a strike end of the horizontal legs of their respective "L" shape cutouts 30, 30a, 36, 36a. The lamp bracket 18 is securely held in the operating position under the bias of the springs 50, 50a, 60, 60a.

Movement of the bracket 18 from the operating (FIG. 2) to the service (FIG. 1) position is accomplished by manually grasping the bracket 18 and moving it in the direction of the arrow 70 against the bias of the springs 60, 60a and clips 50, 50a until the hinge and lock pins 30, 30a, 32, 32a reach the leftmost ends (FIG. 3) of the horizontal legs of the cutouts 38, 38a, 42, 42a. Upon reaching this position, the bracket 18 is rotated in the direction of the arrow 80 until the lock pins 32, 32a are free of their respective lock cutouts 42, 42a. Once the bracket 18 is in this service position, convenient access to the apparatus is obtained.

Although a single embodiment of this invention has been shown and described, it will be understood that various changes in form and detail may be made without departing from the scope and spirit of the invention as defined by the following claims.

What is claimed is:

1. A light source mounting bracket (18) particularly adapted for use with a facsimile document scanner having a scanning mechanism (16) movable along a predetermined path comprising:
   a pair of parallel, spaced apart, end plates (20, 22) between which the light source (24) is positioned, each end plate having an outer surface and an inner facing surface,
   means for maintaining said end plates (20, 22) in spaced apart parallel relationship,
   a pair of coaxial hinge pins (30, 30a) each of which projects from one of the facing surfaces at each of the end plates (20, 22),
   a pair of spatially positioned hinge plates (36, 36a) each of which is secured to the scanning mechanism (16) and each providing a support for one of the hinge pins (30, 30a) thereby providing a hinge for movement of the mounting bracket (18) between an operating position and a service position,
   a release mechanism mounted upon said scanning mechanism (16) and cooperating with said end plates (20, 22) for releasably retaining said mounting bracket (18) in said operating position, and wherein said release mechanism includes a pair of coaxially oriented lock pins (32, 32a) each of which projects from one of the surfaces of each of the end plates (20, 22) and a pair of spatially positioned lock plates (40, 40a) each of which is secured to said scanning assembly (16) and said release mechanism includes means (50, 50a) for engaging and selectively releasing the lock pins (32, 32a) from their respective lock plates (40, 40a).

2. The apparatus of claim 1 wherein said hinge pins (30, 30a) project from the facing surfaces of their respective end plates (20, 22) and said lock pins (32, 32a) project from the facing surfaces of their respective end plates (20, 22).

3. The apparatus of claim 2 wherein said hinge plates (36, 36a) have "L" shaped cutouts (38, 38a) receiving said hinge pins (30, 30a) and first and second hinge springs (60, 60a) resiliently holding said hinge pins (30, 30a) in their respective hinge plate cutouts (38, 38a).

4. The apparatus of claim 3 wherein said lock plates (40, 40a) have "L" shaped cutouts for receiving said lock pins (32, 32a).

5. The apparatus of claim 4 further includes first and second lock clips (50, 50a) maintaining said lock pins (32, 32a) in their respective lock plate cutouts (42, 42a).

6. The apparatus of claim 5 wherein said first and second hinge springs (60, 60a) are in the form of coil springs with a first end of each spring (60, 60a) hooked over its associated hinge pin (30, 30a) and a second end attached to said scanning assembly (16).

7. The apparatus of claim 6 wherein said lock plates (40, 40a) have associated "L" shaped cutouts (42, 42a) for receiving said lock pins (32, 32a).

* * * * *